United States Patent [19]

Kayahara

[11] 4,226,556
[45] Oct. 7, 1980

[54] INJECTION PROCESS AND INJECTION APPARATUS FOR SOLIDIFYING A GROUND

[75] Inventor: Kenji Kayahara, Yokohama, Japan

[73] Assignee: Kyokado Engineering Co., Ltd., Tokyo, Japan

[21] Appl. No.: 942,892

[22] Filed: Sep. 18, 1978

Related U.S. Application Data

[63] Continuation-in-part of Ser. No. 855,463, Nov. 28, 1977, abandoned.

[30] Foreign Application Priority Data

May 16, 1977 [JP] Japan .................... 52/56075

[51] Int. Cl.² ............................................ E02D 3/14
[52] U.S. Cl. ................................. 405/263; 106/74; 106/76
[58] Field of Search ............... 405/263, 264, 266; 166/292, 293; 106/74, 76, 900; 260/DIG. 14

[56] References Cited

U.S. PATENT DOCUMENTS

| | | | |
|---|---|---|---|
| 2,176,266 | 10/1939 | Malmberg | 405/263 |
| 2,960,831 | 11/1960 | Lonaberger et al. | 405/263 |
| 3,375,872 | 4/1968 | McLaughlin et al. | 405/263 |
| 3,376,926 | 4/1968 | McLaughlin et al. | 405/263 |
| 3,672,173 | 6/1972 | Paramore et al. | 166/293 |
| 3,845,632 | 11/1974 | Slobod et al. | 405/263 |
| 4,056,937 | 11/1977 | Suzuki | 106/74 |

*Primary Examiner*—Roy D. Frazier
*Assistant Examiner*—Alexander Grosz
*Attorney, Agent, or Firm*—Martin A. Farber

[57] ABSTRACT

An injection process for solidifying a soft ground by injecting a blend of water glass type grout thereinto which is a non-alkaline aqueous solution of silicic acid obtained by the mixing water glass into an aqueous solution of acidic reactant so as to remove alkali from the water glass, and an injection apparatus for practicing the injection process which comprises a mixing container for preparing the non-alkaline aqueous solution of silicic acid by adding and mixing the water glass into the aqueous solution of acidic reactant.

17 Claims, 2 Drawing Figures

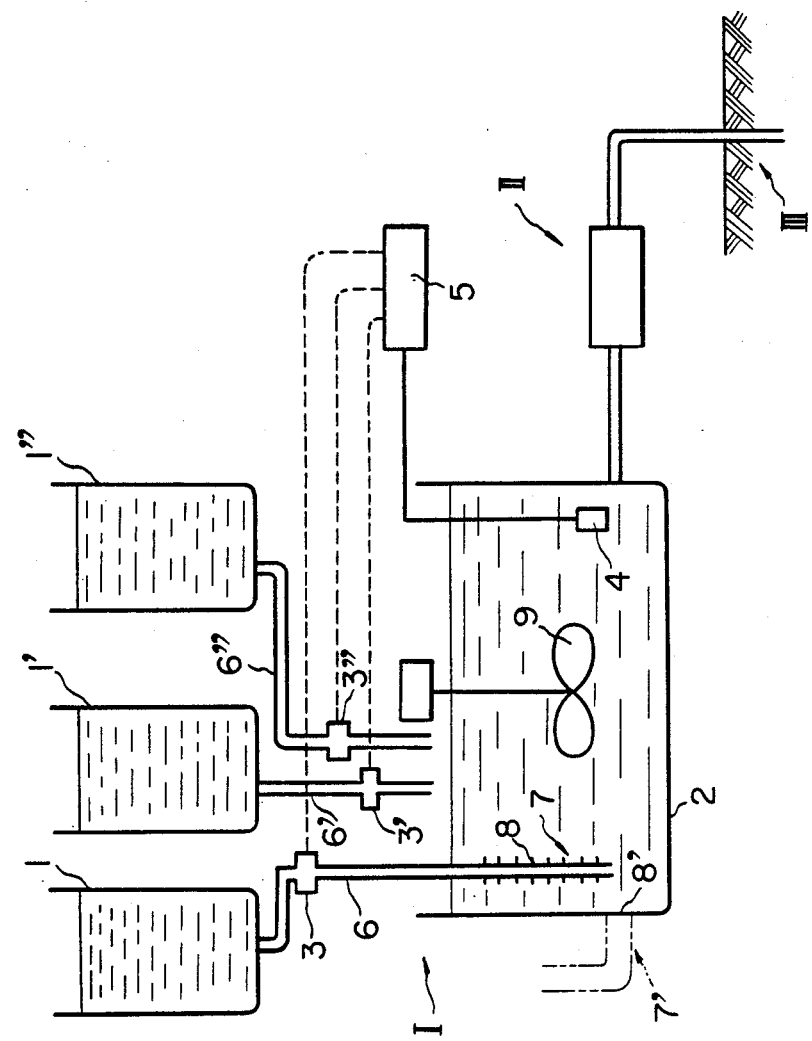

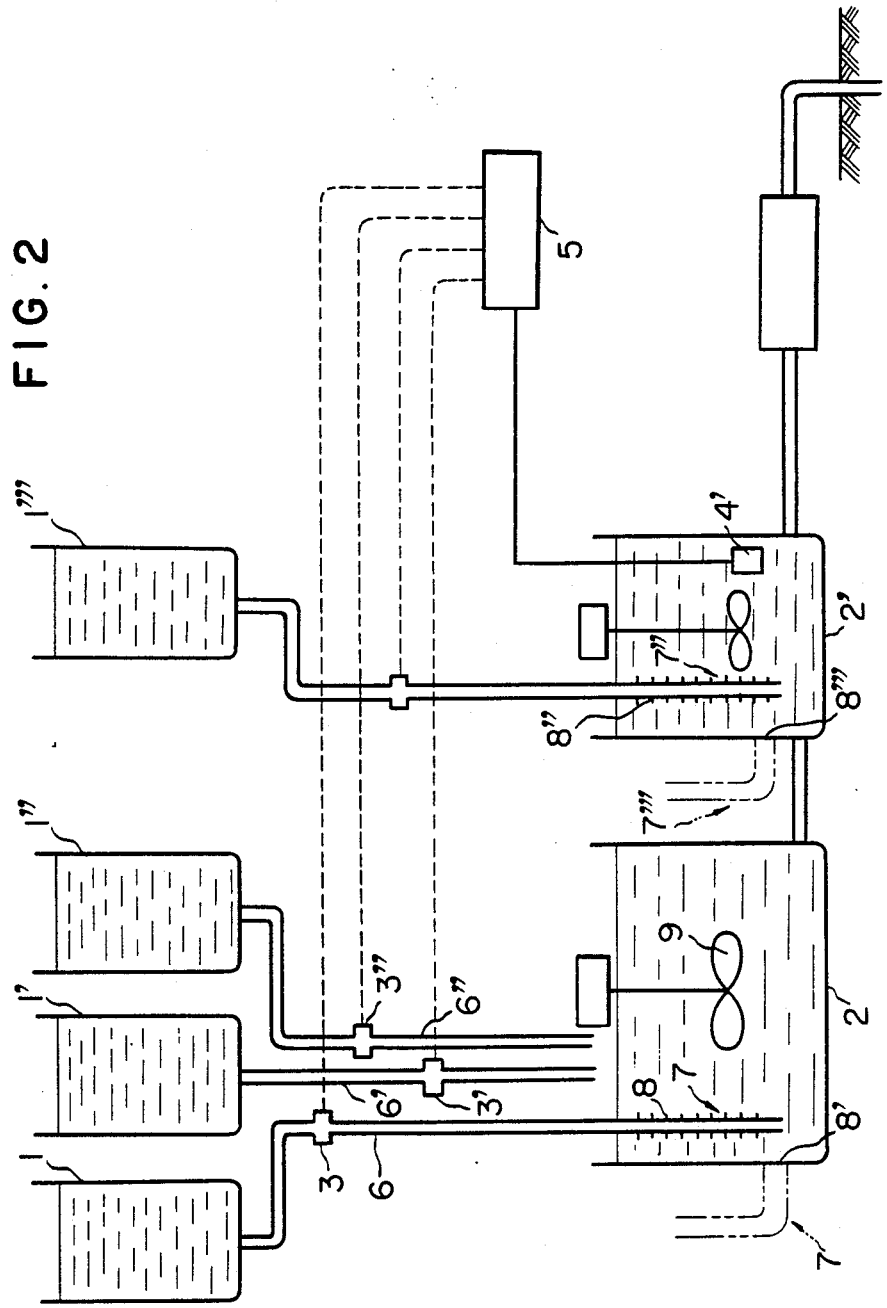

INJECTION PROCESS AND INJECTION APPARATUS FOR SOLIDIFYING A GROUND

This is a Continuation-In-Part application of my co-pending application Ser. No. 855,463, filed Nov. 28, 1977, now abandoned, the benefit of the filing date thereof being claimed.

BACKGROUND OF THE INVENTION

This invention relates to injection processes and apparatuses for practicing the processes in which a soft ground is solidified or water leaking ground is prevented from water leakage (hereinafter the term "solidification" being used to mean both the terms "solidification" and "prevention of water leakage") by injecting a solidifying liquid, or a hardener, thereinto, and more particularly to an injection process and an injection apparatus for practicing the injection process in which a non-alkali aqueous solution of silicic acid is employed as the solidifying liquid, and further more particularly to an injection process and an injection apparatus in which an acidic aqueous solution of silicic acid satisfying certain conditions is employed as the non-alkaline aqueous solution of silicic acid.

In the case where the gelation of water glass is utilized for such an injection process of a ground, it is required for the injection liquid to meet the following conditions:

1. In order to be applicable to the mixing, the injection, and the permeation into a ground in the injection process,
    (1) the gelation time of the injection liquid should be several tens of minutes to several hours or more,
    (2) its viscosity should be several cp to 10 cp,
    (3) the pH value of the injection liquid can be precisely controlled, and
    (4) during the injection process or a mixing process of an injection reactant, blocks of silica should not be separated out in the injection liquid.
2. In order to fulfill the purpose of solidification,
    (1) the uniaxial compression strength should be several kg/cm$^2$ - 10 kg/cm$^2$ or higher,
    (2) the injection liquid should be free from a reduction in strength with time, and excellent in durability.
    (3) the injection liquid should be excellent in solidification in water, and
    (4) the injection liquid should not reduce the solidification of an injection material such as cement grout to be used in combination.
3. In order to follow the purpose of environmental security, or pollution prevention;
    (1) the injection liquid should be such that the quality of water in the injection area is not caused to exceed the predetermined alkaline or acidic limitation and the organic limitation value.

Heretofore, in a conventional ground injection process employing water glass, a reactant is added into the water glass, so as to utilize the gelation of the water glass in the alkaline region.

However, this conventional process suffers from the following drawbacks: In order to obtain a solidification strength of several to 10 kg/cm$^2$ or higher, the concentration of the water glass must be increased. As a result, the pH value of the injection liquid is necessarily approximately 12-11, which leads to a trouble that the underground water is made alkaline.

Furthermore, since some water glass remains unreacted in the gel, the removal of such water glass due to its melting takes place for a long period of time continuously, which results in troubles that the durability of the solidified body cannot be expected, while its strength is reduced with the lapse of time.

In general, if an acidic reactant aqueous solution is gradually added into a water glass aqueous solution while being agitated, with the water glass concentration normally employed in the injection process the gelation is obtained in a range where the pH value is of the alkaline. Furthermore even if the addition of the acidic reactant aqueous solution is further continued until the pH value becomes 7 or is of the acidic, the blend will be in solidification state, that is, it has no longer fluidity.

In the case where the gelation with the pH value being 5-8 or neutral is utilized in the injection process, this method is advantageous in that the pH value of the underground water is not varied, and no variation in strength with time is caused. However, it should be noted that the uniaxial compression strength of the solidified sand is the order of 1 to several kg/cm$^2$, and the gelation time is limited to an extremely short period of time of from a moment to several minutes (especially in summer, the gelation time being reduced more). The gelation time may be increased to several tens of minutes by decreasing the water glass concentration; however, in this case, the strength of the solidified sand is reduced very much to approximately 1 kg/cm$^2$ or less.

As is apparent from the above description, it is difficult for the grout utilizing the gelation in the range of from the weak acidity (around 5) to approximately neutral (up to about 8) to obtain a high solidification strength, with the blending for a relatively long gelation time.

The inventor has found the following facts as a result of a variety of studies, which leads to this invention. That is, if the water glass is added and mixed and desirably mixed by jetting into an acidic reactant aqueous solution, preferably an aqueous solution of a mineral acid such as sulfuric acid, hydrochloric acid or phosphoric acid, then during the mixing operation silicic acid in the water glass is not deposited in the form of blocks of silica, and the alkali in the water glass is removed to provide a non-alkaline solution of silicic acid.

Further, it has been found that under certain conditions, i.e., at pH of 5 or less and $$\frac{[H^+]}{[SiO_2]^n}$$

value of $1 \times 10^{-3}$ or less, the pH value of the ground water in the injected ground is scarcely changed by the injection liquid which comprises the non-alkaline solution of silicic acid. The ground water is maintained at standard pH values of 5.8 to 8.6, though the injection liquid itself is acidic. When the non-alkaline solution of silicic acid which meets the aforementiond conditions is used, it is possible to provide long enough gelation time and sufficient solidification strength, and to solve problems inherent to both water glass grout of alkaline and neutral regions.

The exact reason why the ground, which has been injected the non-allkaline silica sol, assumes acidic pH value has not been elucidated, but, it is anticipated that the pH value of the aqueous silicic solution is an apparent value when it is gelled and the gelation depends upon this pH value, and that colloidal silica in the acidic aqueous solution of silicic acid contains alkali when the solution is gelled, and after the gelation a neutralization reaction takes place between said alkali and the acid present in the structure of the gel.

Experiments have shown that when the non-alkaline aqueous solution of silicic acid, which meets the aforementioned conditions and assumes acidic, is gelled and cured in water, the pH value of the curing water is acidic at the beginning and then gradually changes to neutral. This suggests that the anticipation described above is reasonable.

Employing the non-alkaline aqueous solution of silicic acid which completely meets the aforementioned conditions, it is now possible to carry out the injection process without conventional difficulties.

SUMMARY OF THE INVENTION

Accordingly, it is a first object of this invention to provide a ground injection process in which the gelation time of an injection liquid is relatively long, and an injection apparatus for practicing the process.

A second object of the invention is to provide a ground injection process and a ground injection apparatus as described in the first object.

A third object of the invention is to provide a ground injection process and a ground injection apparatus as described above, in which the injection liquid is excellent in permeability.

A forth object of the invention is to provide a ground injection process and a ground injection apparatus as described above, in which a body solidified thereby is great in strength.

A fifth object of the invention is to provide a ground injection process and a ground injection apparatus as described above, in which blocks of silica are not formed.

A sixth object of the invention is to provide a ground injection process and a ground injection apparatus as described above, in which the pH value of the injection liquid can be completely controlled, and the gelation time thereof can be precisely set.

The foregoing objects and other objects of this invention has been achieved, in one aspect of the invention, by providing an injection process by injecting a water glass type grout blend thereinto, in which said grout blend is a non-alkaline aqueous solution of silicic acid obtained by mixing water glass into an acidic reactant aqueous solution so as to remove alkali from the water glass, and the non-alkaline aqueous solution of silicic acid meets the following condition A or both of the following conditions A and B.

Condition A: the pH value thereof is 5 or less, and
Condition B: a value of $$\frac{[H^+]}{[SiO_2]^n}$$

is $1 \times 10^{-3}$ or less, where $[H^+]$ is the molar concentration of hydrogen ions, $[SiO_2]$ is the molar concentration of silicon dioxide, and n is the molar ratio of the water glass.

Furthermore, the foregoing objects and other objects of the invention has been achieved, in another aspect of the invention, by providing an injection apparatus for injecting a water glass type grout blend thereinto, the apparatus including a mixing mechanism for preparing a non-alkaline aqueous solution of silicic acid, the mixing mechanism comprising: material containers for containing materials for preparation of the non-alkaline aqueous solution of silicic acid; a mixing container connected through pipes to the material containers, the mixing container being adapted to prepar the non-alkaline aqueous solution of silicic acid by adding and mixing water glass into acidic reactant aqueous solution therein; a supplying mechanism provided in each of the pipes, for supplying the materials in the material containers to the mixing container, in which, by jetting water glass into the acidic aqueous solution of the reactant supplied in the mixer, it is possible to blend to a desirable extent without depositing blocks of silica; a pH detector provided optionally in the mixing container, for detecting a pH value of the non-alkaline aqueous solution of silicic acid; and an optional pH controller operatively connected to the supplying mechanisms and the pH detector, the controller operating to receive a detection signal produced by the pH detector, to transmit the detection signal to the supplying mechanisms, and to control the operations of the supplying mechanisms so that the pH value of the non-alkaline aqueous solution of silicic acid is in a desired range, and that said aqueous solution meets the following condition A or the both of the following conditions A and B:

Condition A: the pH value of the non-alkaline aqueous solution of silicic acid is 5 or less, and
Condition B: a value of $$\frac{[H^+]}{[SiO_2]^n}$$

is $1 \times 10^{-3}$ or less.

In the process of this invention, by employing a flow of the non-alkaline aqueous solution of silicic acid at pH of 5 or less and $$\frac{[H^+]}{[SiO_2]^n}$$

value of $1 \times 10^{-3}$ or less, the pH value of ground water in the injected ground remains neutral and causes no environmental pollution. Furthermore, the process of this invention possesses outstanding characteristics of penetration, strength and durability.

The injection apparatus of this invention comprises a mixing mechanism in which, by jetting water glass into the acidic aqueous solution of the reactant, the non-alkaline aqueous solution of silicic acid, which has desired values of pH and $$\frac{[H^+]}{[SiO_2]^2}$$

as well as outstanding characteristics as an injection reactant, is prepared. This mixing mechanism greatly contributes to successfully practicing the grout process of said non-alkaline solution. A pH detector may be equipped to the mixing mechanism in order to readily provide the non-alkaline silica gel at desired pH and $$\frac{[H^+]}{[SiO_2]^n}$$

values.

The nature, principle, and utility of this invention will become more apparent from the following detailed description and the appended claimes when read in conjunction with the accompanying drawings which are provided for a description of embodiments of the injection apparatus according to this invention.

BRIEF DESCRIPTION OF THE DRAWINGS

In the accompanying drawings:
FIGS. 1 and 2 are explanatory diagrams illustrating embodiments of an injection apparatus according to this invention.

DETAILED DESCRIPTION OF THE INVENTION

The most specific feature of this invention resides in that first of all, an acidic reactant aqueous solution is prepared, and then water glass is jetted into the aqueous solution while being agitated at high speed so as to mix the former in the latter, thereby to provide a non-alkaline aqueous solution of silicic acid obtained by removing alkali from the water glass, and that the aqueous solution thus provided is adjusted to pH of 5 or less and $$\frac{[H^+]}{[SiO_2]^n}$$

value of $1 \times 10^{-3}$ or less.

In the preparation of the acidic aqueous solution of silicic acid suitable for the injection process, in which blocks of silica are not deposited, by use of concentrated water glass, the jet mixing system is very important. When this system is not employed, blocks of silica are readily deposited even if the solution is vigorously agitated. In order to prepare said acidic aqueous solution which has pH of 5 or less and $$\frac{[H^+]}{[SiO_2]^n}$$

value of $1 \times 10^{-3}$ or less and which gelation time is long enough without deposition of blocks of silica, it is desirable to meet following conditions:

(a) The water glass should be added to the acidic aqueous solution by the jet mixing;

(b) In the acidic aqueous solution, a mineral acid such as sulfuric, hydrochloric or phosphoric acid is used as an acidifier. (Blocks of silica are formed if an acidic solution of acid salts which contain metallic ions is used);

(c) The water glass aqueous solution or an alkaline salt such as carbonate or bicarbonate is used as a pH adjusting agent, when the acidic solution of lower pH value is prepared and then the solution is adjusted to desired pH by means of the pH adjusting agent.

These greatly contribute to the most efficient injection process of the non-alkaline aqueous solution of silicic acid, and make such process practical.

In the case of the non-alkaline aqueous solution of silicic acid thus obtained, during the blending operation the silicon dioxide is not deposited in the form of a block, and the viscosity of the aqueous solution is relatively low. In addition, after the lapse of a sufficiently long period of time for permeation of the aqueous solution into the ground, all the quantity of silicon dioxide in the water glass is deposited, which leads to the complete solidification of the aqueous solution. Accordingly, the non-alkaline aqueous solution of silicic acid is high in solidification strength and excellent in permeability because it is low in viscosity, as was described, and will never be clogged between the soil particles (it being also excellent in sollidification in water). In addition, since the aqueous solution is acidic that the pH value is 5 or less, its gelation time can be made relatively long even if concentrated water glass is employed. Therefore, the blending in the mixer can be precisely conducted, the pH value of the injection liquid can be completely controlled, and the gelation time can be accurately set. Furthermore, the aqueous solution is capable of gelatinating itself, and is therefore gelatinated in a predetermined period of time. Therefore, the aqueous solution is scarcely allowed to leak into the underground water. Even if the aqueous solution itself is acidic, its trend to bring the pH value of the underground water to the acidic side is extremely low. That is, the aqueous solution has unique characteristics that the pH value of the underground water is maintained within the water standard range of waste water, i.e., pH 5.8-8.6 under the standing rule. Normally, the aqueous solution is maintained at more neutral pH value than 5.8. The characteristics should be highly appreciated in the point of view of securing water quality. (The characteristics are more significant especially when $$\frac{[H^+]}{[SiO_2]^n}$$

value is $1 \times 10^{-3}$ or less).

In order that the above-described non-alkaline aqueous solution of silicic acid positively maintains the above-described variety of characteristics, it is necessary to set the value of $$X = \frac{[H^+]}{[SiO_2]^n}$$

to $1 \times 10^{-3}$ or less. That is, on the basis of fact that the characteristics of the injection liquid are not determined merely by the composition, concentration, pH value, etc. of the water glass, but these elements are synthetically related to one another to determine the characteristics, the inventor has found that if it is assumed that one factor synthetically related to the above-mentioned elements is represented by $$X = \frac{[H^+]}{[SiO_2]^n},$$

when this value X is $1 \times 10^{-3}$ or less, especially in the range of from $1 \times 10^{-3}$ to $1 \times 10^{-6}$, the injection liquid will have considerably excellent characteristics.

In other words, according to the inventor's study, it has been found that the non-alkaline aqueous solution of silicic acid which is capable of gelatinate itself and whose $$X = \frac{[H^+]}{[SiO_2]^n}$$

is $1\times 10^{-3}$ or less and especially is in the range of about $1\times 10^{-3}$–$1\times 10^{-6}$ shows outstanding characteristics satisfying a variety of conditions required in the injection process, especially in the effect on the pH value of the underground water, the solidification in water, and the durability of the solidified body.

As will become clear from experiments described later, when $X > 1\times 10^{-3}$, the underground water is liable to become acidic, and the solidification in water is lowered. On the other hand, when $X > 5\times 10^{-6}$, it is difficult to maintain the suitable permeation time, and the viscosity is increased. Thus, in the range of $1\times 10^{-3} > X > 5\times 10^{-6}$, a sufficiently high strength and a sufficiently long permeation time can be obtained, and in spite of the fact that the aqueous solution is acidic, the pH value of the underground water is scarcely changed and is maintained in the range of the waste water standard pH 5.8-8.6, and in addition the durability is also maintained unchanged.

Table 1 is to indicate values of X with respect to pH, $[H^+]$, and $[SiO_2]$ in the case when the water glass having a molar ratio of 3 is employed. In this table, the water glass employed is of the following data:
  $SiO_2$; 29.1% (M=60)
  $Na_2O$; 10.0%
  n; 3.0
  Specific gravity: 1.4 (20° C.)

According to the inventor's study, the non-alkaline aqueous solution of silicic acid shows outstanding characteristics when it satisfies two conditions; that is, pH=5 or less, and $X=1\times 10^{-3}$ or less, preferably pH=2-5, and $1\times 10^{-3} > X > 5\times 10^{-6}$. The results of the tests made by the inventor some of which are described later, are indicated in Table 1. In Table 1, the area encircled by the heavy line (two lines) is intended to designate the range of said aqueous solutions in which the pH value is more acidic than 5 with $1\times 10^{-3} > X > 5\times 10^{-6}$.

The mixing mechanism I comprises material containers 1, 1' and 1'', a mixing container 2, supplying mechanisms 3, 3' and 3''. The non-alkaline aqueous solution of silicic acid is prepared in accordance with the following steps: First, water glass, acidic reactant, and water are put in the material containers 1, 1' and 1'', respectively. Then, the acidic reactant and the water are delivered into the mixing container 2 respectively from the material containers 1' and 1'' through pipes 6' and 6'', whereby acidic reactant aqueous solution is prepared in the mixing container 2.

Since the supplying mechanisms 3' and 3'' are provided in the paths of the pipes 6' and 6'', respectively, the acidic reactant and the water are delivered into the mixing container 2 by the operation of these supplying mechanisms. As the supplying mechanism, a switching valve or a supplying pump can be employed, for instance. Then, the water glass is added into the acidic reactant in the mixing container 2, and the non-alkaline aqueous solution of silicic acid is prepared by mixing these two materials. The water glass, as was described before, is jetted into the acidic reactant aqueous solution from a jetting device 7 through the material container 1 and the pipe 6 by the operation of the supplying mechanism 3. The jetting device 7 is formed by providing jetting apertures 8 in the end portion or the side wall of the pipe 6. The jetting apertures 8 are holes or nozzles opened towards the inside of the mixing container 2, and are adapted to provide jet streams of water glass. If the jet pressure is set to 0.5–30 kg/cm², and preferably several kg/cm² by controlling the supplying mechanism 3, it is sufficiently possible to allow the water glass to be added into and mixed with the acidic reactant aqueous solution. However, it is obvious that sufficient mixing of these material can be achieved by use of an agitator 9 operating at high speed with jetting.

Furthermore, it is possible to use a jetting device 7' having a jetting hole 8' opened on the side wall of the mixing container 2, instead of the jetting device 7.

As described above, the mixing method in which the water glass is added by jetting into the acidic reactant solution is a very important factor to put the water glass process using the non-alkaline silica sol to practical use. This method makes it possible to produce the grout by use of the non-alkaline silica sol which does not deposit

TABLE 1

| pH | $[H^+]$ | $[SiO_2]$ | $X = [H^+] / [SiO_2]^3$ | | | | |
|---|---|---|---|---|---|---|---|
| | | | 0.66 | 1.02 | 1.36 | 2.04 | 3.40 |
| 1 | $10^{-1}$ | | $3.45\times 10^{-1}$ | $9.43\times 10^{-2}$ | $3.97\times 10^{-2}$ | $1.18\times 10^{-2}$ | $2.55\times 10^{-3}$ |
| 2 | $10^{-2}$ | | $3.45\times 10^{-2}$ | $9.43\times 10^{-3}$ | $3.97\times 10^{-3}$ | $1.18\times 10^{-3}$ | $2.55\times 10^{-4}$ |
| 3 | $10^{-3}$ | | $3.45\times 10^{-3}$ | $9.43\times 10^{-4}$ | $3.97\times 10^{-4}$ | $1.18\times 10^{-4}$ | $2.55\times 10^{-5}$ |
| 4 | $10^{-4}$ | | $3.45\times 10^{-4}$ | $9.43\times 10^{-5}$ | $3.97\times 10^{-5}$ | $1.18\times 10^{-5}$ | $2.55\times 10^{-6}$ |
| 5 | $10^{-5}$ | | $3.45\times 10^{-5}$ | $9.43\times 10^{-6}$ | $3.97\times 10^{-6}$ | $1.18\times 10^{-6}$ | $2.55\times 10^{-7}$ |
| 6 | $10^{-6}$ | | $3.45\times 10^{-6}$ | $9.43\times 10^{-7}$ | $3.97\times 10^{-7}$ | $1.18\times 10^{-7}$ | $2.55\times 10^{-8}$ |
| 7 | $10^{-7}$ | | $3.45\times 10^{-7}$ | $9.43\times 10^{-8}$ | $3.97\times 10^{-8}$ | $1.18\times 10^{-8}$ | $2.55\times 10^{-9}$ |

This invention will be described with reference to the accompanying drawings, in which FIGS. 1 and 2 are explanatory diagrams illustrating examples of an apparatus for practicing an injection process according to this invention.

The apparatus comprises a mixing mechanism I for preparing non-alkaline aqueous solution of silicic acid, an injecting pipe mechanism III, and a conveying or transferring mechanism II. An actual or concrete example of this conveying mechanism II is, for instance, an injection pump.

blocks of silica. It is impossible to avoid formation of such blocks when an acid is added to the water glass and agitated, or when the water glass is added to the acidic aqueous solution and simply stirred.

According to this invention, the mixing mechanism I can be provided with a pH detector 4 and a pH controller 5.

In this opening, the pH value of the non-alkaline aqueous solution of silicic acid in the mixing container 2 is controlled by the pH detector 4. Variations in pH value are transmitted to the controller 5. When the pH value reaches a predetermined value, the controller 5 produces a command by which the supplying mechanism 3 is closed to suspend the supplying of the water glass, whereby the non-alkaline aqueous solution of silicic acid having a desired pH value can be obtained. The non-alkaline aqueous solution thus obtained is injected into the soil through the conveying mechanism II.

Alternatively, the adjustment of the pH value may be achieved in accordance with the following procedure: As shown in FIG. 2, a non-alkaline aqueous solution of silicic acid having a pH value which is roughly close to the desired one is first prepared in a mixing container 2. Then, the aqueous solution thus prepared is put in another mixing container 2', where similarly as in the above-described case pH adjusting agent is allowed to add into the aqueous solution in the mixing container 2' from a material container 1''' through a jetting device 7'' with jetting apertures 8'' or a jetting device 7''' with jetting apertures 8''' so that the pH value of the solution is finely adjusted to the desired value. As a result, it may be possible to change the gelation time of said aqueous solution to a desired gelation time.

This invention will be further described with reference to a variety of experiments:

Experiment-1

An acidic liquid is prepared by using concentrated sulfuric acid as acidic reactant. A water glass with $n=3$ is mixed with the acidic liquid by above mentioned way, thereby preparing a non-alkaline aqueous solution of silicic acid.

The experimental data concerning the relationships between the ratio of sulfuric acid (98%) to water glass (undiluted solution) and the pH value of non-alkaline silicic acid aqueous solution are as indicated below:

| α  | 0.175 | 0.164 | 0.160 | 0.157 |
|----|-------|-------|-------|-------|
| pH | 1.0   | 1.3   | 2.4   | 3.0   |

Where $\alpha = \dfrac{\text{Sulfuric acid (98\%)}}{\text{Water glass (n = 3)}}$ (weight ratio)

Thus, said aqueous solutions can be prepared as desired whose pH value is in a range less than 5 in pH.

In general, the gelation time of non-alkaline silicic acid aqueous solution is in well correspondence to its pH value. However, as is apparent from the relationships between α and pH indicated above, it is almost impossible to precisely adjust the pH value by varying the quantities of the water glass and of the acidic reactant. That is the pH value is varies to a great extent by a slight difference in the quantity of each of the water glass and the acidic reactant employed, and accordingly the gelation time is also fluctuated to a great extent. In order to overcome this difficulty, in the first process the pH value is roughly determined through blending mainly by measuring the water glass and the acidic reactant, and then in the second process the gelation time is controlled mainly by controlling the pH value with a pH meter while adding the pH adjusting agent. Said process makes it easy to apply a gelation of acidic silicic aqueous solution to injection process for solidifying a ground.

In accordance with this method, sulfuric acid is employed as the acidic reactant in the range of $SiO_2$ as shown below, and a blend having a pH value of approximately 2.5 is prepared in the first process. Then, in the second process, the pH value is finely adjusted by using a pH adjusting agent like sodium bicarbonate or water glass. By using the resultant acidic silicic acid, fine sand was solidified, and its uniaxial compression strength was measured one week after.

Classification of $SiO_2$ Concentration (Molar concentration)

|    | $SiO_2$     |
|----|-------------|
| a. | 0.66–1.02   |
| b. | 1.02–1.36   |
| c. | 1.36–2.04   |
| d. | 2.04–3.40   |

Shown in Table 2 below are the range of gelation time and the range of strength with respect to pH and $[SiO_2]$. ($n=3.0$)

TABLE 2

| | | Range of Gelation Time (minute (')) (20°) | | | |
|---|---|---|---|---|---|
| pH | $[SiO_2]$ | 0.66–1.02 | 1.02–1.36 | 1.36–2.04 | 2.04–3.40 |
| 2–3 | | –1900' | –620' | –130' | 2500'–19' |
| 3–4 | | 9000'–100' | 1900'–33' | 620'–7' | 130'–0 |
| 4–5 | | 500'–5' | 100'–2' | 33'–2' | 7'–0 |
| 5–6 | | 20'–0 | 5'–0 | 2'–0 | |
| 6–7 | | 1'–0 | | | |
| Strength qu(kg/cm²) | | 1.0–2.5 | 2.5–5 | 5–10 | 10–18 |

It will be apparent from Table 2 that the gelation time is relatively short and the strength is also relatively low when the pH value is in the range of from 5 to 7. In contrast, the gelation time is relatively long, and the strength is relatively high in the range where the pH value is less than 5.

Experiment-2

In order to see how the pH value of underground water varies in practicing this invention, fine sand was put in a water tank 30 cm wide, 1 m long and 30 cm high, and an underground water layer was formed with water of pH 7 therein. Then, a block of fine sand 10 cm wide, 30 cm long and 30 cm thick solidified by the non-alkaline aqueous solution of silicic acid was imbedded in one end portion of the inside of the fine sand in the water tank. The water was sampled from the other end portion to measure the pH value thereof one week thereafter. In this connection it should be noted that said aqueous solution was prepared in accordance with Experiment-1. The following matters can be understood from Table 3: In the case where the non-alkaline aqueous solution of silicic acid is injected, the pH value of the underground water is more or less shifted to acidic, but it is much closer to the neutral than the pH value of the blend, and the extent that the pH value of the underground water is shifted to acidic is varied greatly depending on the range in "X" value of the blend. In the case where the "X" value is more than $1 \times 10^{-3}$, the extent that the underground water becomes acidic is relatively great; however, in the case where the "X" value of the blend is less than $1 \times 10^{-3}$, the pH value of the underground water is higher then 5.8 at all times which is the pH value specified by water quality regulation. In addition, the condition in distribution of pH values higher than 5.8 can be seen in Table 3.

The inventor has found as a result of various studies that the silicic aqueous solution within said pH range shows acidic pH values before gelation, but, after the gelation, when the gel is immersed into water, the pH value of water surely moves to neutral with a lapse of time, although it shows acidic at the beginning.

For example, this experiment showed that the pH values of the curing water in the ground injected said aqueous solution of $[SiO_2]=2.04$ and $pH=2.5$ changed 4.8, 5.4, 5.8, 6.0 and 6.3 after 1, 3, 5, 7 and 30 days, respectively.

Experiment-3

Two hundreds cc of the blend was injected into the soil in the water tank by means of a simulated injecting device. The blend was prepared in accordance with Experiment-1.

One week later, the volume of the solidified body was measured, whereby in the case of injecting the blend into the soil under the surface of the underground water the ratio of the quantity of the solidified soil to the quantity of the blend was measured.

$$\text{Solidification rate } \beta = \frac{\text{Quantity of solidified soil}}{\text{Quantity of blend}}$$
(volume ratio)

The resultant data are indicated in Table 4.

From Table 4, it is seen that high solidification rates can be obtained when the pH value of the blend is 5 or less and $X<10^{-3}$. Furthermore, from Table 4, the distribution of the solidification rates $\beta$ higher than 2.5 can be seen.

Experiment-4

Non-alkaline aqueous solutions of silicic acid were prepared in accordance with the method employed in Experiment-1, and were injected into fine sand in molds by means of a hand pump, for the provision of specimens. By utilizing these specimens, the uniaxial compression strengths of the solidified sands were measured with the lapse of time.

The preparations, initial viscosities, and uniaxial compression strengths of the non-alkaline aqueous solutions of silicic acid employed for the specimens are indicated in Table 5, items 1 through 5.

Examples of blends in the alkaline region employing sulfuric acid as the reactant thereof are indicated in Table 5, items 6 through 10.

From Table 5, it is seen that the aqueous solution according to this invention is low in viscosity, and considerably high in durability, and that its strength increases with the lapse of time.

The acidic reactants employed in this invention are non-organic acids such as sulfuric acid, hydrochloric acid, nitric acid, and phosphoric acid; organic acids such as formic acid, acetic acid, and succinic acid; acidic salts such aluminium chloride, aluminium sulfate, monocalcium phosphate, monosodium phosphate, and sodium hydrogensulfate; and materials such as ester, amides, and aldehydes such as for instance glyoxal, which give rise to hydrolysis in the presence of alkali to provide acidic radicals; materials which show acidic pH values at a state of solution, such as gaseous carbon dioxide.

TABLE 3

| pH Classification | pH value of non-alkaline aqueous solution of silicic acid | Molar concentration of $SiO_2$ in non-alkaline aqueous solution of silicic acid | Value of pH (values on upper left) and of X (values on lower right) of water sampled out of the water tank. | | | | |
|---|---|---|---|---|---|---|---|
| | | | 0.66 | 1.02 | 1.36 | 2.04 | 3.40 |
| 0.5–1.0 | 0.7 | | 2.0<br>$6.9 \times 10^{-1}$ | 2.0<br>$1.9 \times 10^{-1}$ | 2.2<br>$7.9 \times 10^{-2}$ | 2.2<br>$2.4 \times 10^{-2}$ | 3.0<br>$5.1 \times 10^{-3}$ |
| 1.0–2.0 | 1.8 | | 3.8<br>$5.5 \times 10^{-2}$ | 3.8<br>$1.5 \times 10^{-2}$ | 3.9<br>$6.3 \times 10^{-3}$ | 4.5<br>$1.9 \times 10^{-3}$ | 5.8<br>$4.1 \times 10^{-4}$ |
| 2.0–3.0 | 2.5 | | 4.7<br>$1.1 \times 10^{-2}$ | 4.8<br>$3.1 \times 10^{-3}$ | 5.0<br>$1.3 \times 10^{-3}$ | 6.0<br>$3.9 \times 10^{-4}$ | 6.3<br>$8.4 \times 10^{-5}$ |
| 3.0–4.0 | 3.3 | | 5.1<br>$1.7 \times 10^{-3}$ | 6.0<br>$4.7 \times 10^{-4}$ | 6.1<br>$2.0 \times 10^{-4}$ | 6.4<br>$5.9 \times 10^{-5}$ | 6.5<br>$1.3 \times 10^{-5}$ |
| 4.0–5.0 | 4.5 | | 6.2<br>$1.1 \times 0^{-4}$ | 6.3<br>$3.1 \times 10^{-5}$ | 6.5<br>$1.3 \times 10^{-5}$ | —<br>$3.9 \times 10^{-6}$ | —<br>$8.4 \times 10^{-7}$ |
| 5.0–6.0 | 5.8 | | 6.8<br>$1.1 \times 10^{-5}$ | —<br>$3.0 \times 10^{-6}$ | —<br>$1.3 \times 10^{-6}$ | —<br>$3.8 \times 10^{-7}$ | —<br>$8.1 \times 10^{-8}$ |

In the table, symbol (—) is intended to mean that it was impossible to provide a solidified specimen in a laboratory experiment.

TABLE 4

| pH classification | pH value of non-alkaline aqueous solution of silicic acid | Molar concentration $SiO_2$ in non-alkaline aqueous solution of silicic acid | Solidification rate $\beta$ (values on upper left) and value of X (values on lower right) | | | | |
|---|---|---|---|---|---|---|---|
| | | | 0.66 | 1.02 | 1.36 | 2.04 | 3.40 |
| 1.0–2.0 | 1.8 | | 0<br>$5.5 \times 10^{-2}$ | 0<br>$1.5 \times 10^{-2}$ | 0.3<br>$6.3 \times 10^{-3}$ | 0.5<br>$1.9 \times 10^{-3}$ | 2.5<br>$4.1 \times 10^{-4}$ |
| 2.0–3.0 | 2.5 | | 0.5<br>$1.1 \times 10^{-2}$ | 0.8<br>$3.1 \times 10^{-3}$ | 1.0<br>$1.3 \times 10^{-3}$ | 3.0<br>$3.9 \times 10^{-4}$ | 3.0<br>$8.4 \times 10^{-5}$ |
| 3.0–4.0 | 3.3 | | 1.0 | 3.0 | 3.0 | 3.3 | 2.6 |

TABLE 4-continued

| pH classification | pH value of non-alkaline aqueous solution of silicic acid | Molar concentration SiO₂ in non-alkaline aqueous solution of silicic acid | Solidification rate β (values on upper left) and value of X (values on lower right) | | | | |
|---|---|---|---|---|---|---|---|
| | | | 0.66 | 1.02 | 1.36 | 2.04 | 3.40 |
| 4.0–5.0 | 4.5 | 2.6 | $1.7 \times 10^{-3}$ / 2.8 / $1.1 \times 10^{-4}$ | $4.7 \times 10^{-4}$ / $3.1 \times 10^{-5}$ | $2.0 \times 10^{-4}$ / 2.5 / $1.3 \times 10^{-5}$ | $5.9 \times 10^{-5}$ / — / $3.9 \times 10^6$ | $1.3 \times 10^{-5}$ / $8.4 \times 10^{-7}$ |
| 5.0–6.0 | 5.5 | 2.0 | — / $1.1 \times 10^{-5}$ | $3.0 \times 10^{-6}$ | $1.3 \times 10^{-6}$ | $3.8 \times 10^{-7}$ | $8.1 \times 10^{-8}$ |

In the table, symbol (—) is intended to mean that it was impossible to perform the injection in a laboratory experiment.

TABLE 5

| | Non-alkaline aqueous solution of silicic acid | | | | | Strength of solidified specimen with the lapse of day, uniaxial compression strength qu (kg/cm²) | | |
|---|---|---|---|---|---|---|---|---|
| Item | (SiO₂) | pH | Gelation time (Minutes '; solution temperature 20° C.) | X | Initial viscosity cp/sec | 3 days later | 7 days later | 28 days later |
| 1 | 0.66 | 4.5 | 118' | $1.07 \times 10^{-4}$ | 1.3 | 1.5 | 1.8 | 2.5 |
| 2 | 1.02 | 4.1 | 72' | $7.36 \times 10^{-5}$ | 1.5 | 2.0 | 2.5 | 3.1 |
| 3 | 1.36 | 3.8 | 60' | $6.35 \times 10^{-5}$ | 1.8 | 4.6 | 5.2 | 7.0 |
| 4 | 2.04 | 3.2 | 74' | $7.42 \times 10^{-5}$ | 2.0 | 8.0 | 9.8 | 13.4 |
| 5 | 3.40 | 2.8 | 35' | $4.07 \times 10^{-5}$ | 4.2 | 15.5 | 18.3 | 23.8 |
| 6 | 1.02 | 11.0 | 25' | — | 2.5 | 0.8 | 0.5 | 0.2 |
| 7 | 1.34 | 11.5 | 30' | — | 3.0 | 1.2 | 1.0 | 0.5 |
| 8 | 2.04 | 11.1 | 28' | — | 4.5 | 1.7 | 1.5 | 1.1 |
| 9 | 3.40 | 11.0 | 15' | — | 8.5 | 2.0 | 1.5 | Break |
| 10 | 3.40 | 10.0 | 0 | — | | | | |

However, the use of strong inorganic acids is most economical. They contain no organic material which pollutes the underground water. Mineral acids such as sulfuric, hydrochloric or phosphoric acid are most suitable because acid salts of metallic ions often form blocks of silica. Acidic or alkaline compounds can be effectively employed as the pH adjusting agents. As the acidic compounds, non-alkaline solutions of silicic acid in addition to the above-described acids can be employed. On the other hand, weak acids such as for instance phosphoric acid, or acidic salts such as for instance monosodium phosphate, or said aqueous solutions are suitable for finely adjusting the pH value.

As the alkaline compounds are listed alkalis such as caustic soda and slaked lime; basic salts such as sodium carbonate, sodium bicarbonate, bisodium phosphate, and sodium aluminate; oxides such as magnesium oxide and calcium oxide whose aqueous solutions are alkaline; and compounds such as water glass and cement whose aqueous solutions are alkaline. However, it should be understood that the alkaline compounds are not limited thereto or thereby.

For the fine adjustment of the pH value, out of the above described materials, especially the compounds such as sodium bicarbonate and bisodium phosphate which are of the weak alkaline, and water glass aqueous solutions are suitable.

In this invention, optional compounds can be employed as the strength increasing agent or the gelation time adjusting agent. Such compounds are, for instance, inorganic salts such as chlorides, chlorates, sulfates, aluminates, carbonates, bicarbonates, bisulfates, bisulfites, fluosilicates, silicates, phosphates, hydrogenphosphates, pyrophosphates, dichromates, and permanganates; optional organic salts, alcohols, other metallic oxides, slug, flyash, calcium silicate, cement and clay. Again, it should be noted that the compounds are not limited thereto.

Furthermore, in this invention, optional liquid-state water glass whose molar ratio n [SiO₂/M₂O]=1.5 to 5.0 can be employed as the water glass. In addition, it is a matter of course that the above-described blend mixed with bentonite or other optional ratio can be employed.

One of the significant features of the injection process carried out with a grout of non-alkaline silicic acid aqueous solution according to this invention resides in that a grout containing cement is used in combination therewith. As was described before, in the case of application of the non-alkaline aqueous solution of silicic acid to the injection process, a variety of excellent characteristics can be obtained; however, it is rather difficult to finely adjust the gelation time, and the blending must be precisely carried out in the mixer in order to adjust the pH value to the correct value. Owing to these requirements, it is necessary to make the gelation time as long as possible for the purpose of carrying out the blending operation or the injecting operation.

However, if a grout relatively long in gelation time is injected into a layer of coarse soil or a soil in which underground water is allowed to flow, the solution thus injected is caused to move out of a predetermined area or is allowed to flow away. On the other hand, in the case where the cement grout and said aqueous solution grout are, in combination, use for such an injection process, even if a blend whose such aqueous solution is long in gelation time is used, the pH value of said aqueous solution approaches the neutral because of the neutralization reaction effected between the blend and the excessive alkali in the cement grout, as a result of which the gelation time is reduced and the solidification is accomplished quickly. Therefore, even if the solution is injected into such a layer of coarse soil or a soil in which the underground water is allowed to flow, the solution thus injected will never be caused to move out of the predetermined area or to flow away; that is, the solution can be solidified in the predetermined area.

Method of utilizing an injection of a non-alkaline aqueous solution of silicic acid whose pH value is 5 or less (hereinafter referred to as "an injection A", when applicable) and an injection of a suspension containing cement (hereinafter referred to as "an injection B", when applicable) in combination can be roughly classifies into the follow two classes:

Class (1): in which the injections A and B are successively carried out (regardless of the order of the injections, that is, the injection A may be carried out first, and then the injection B, or vice versa); or the solutions in the injections A and B are joined together before injection; or an injection of the joined solutions in the injections A and B and either of the injections A and B (reglardless of the order thereof) are successively carried out.

Class (2): in which one of the injections A and B is first carried out, and thereafter the other is carried out with a pause period of time.

As the cement used in combination in this invention may be employed Portland cement, colloid cement, almina cement, and Portland blast furnace cement. Furthermore, it goes without saying that any of the reactants described as the pH adjusting agents or the strength increasing agents before can be added into the cement-blended solution. Especially, if an alkaline compound such as sodium carbonate is added into the cement grout, the mixture of the non-alkaline silicic acid aqueous solution and the cement ground is markedly increased in solidification strength.

The injection according to this invention is carried out after the blending is carried out with a mixer until the pH value of the blend reaches a desired value. In this connection, an optional non-alkaline aqueous solution of silicic acid or an aqueous solution obtained by adding the pH adjusting agent or the strength increasing agent into said aqueous solution is provided as liquid A; while the aqueous solution of the pH adjusting agent is provided as liquid B, and then the liquids A and B thus provided can be joined together with the aid of two sets of pumps to have a predetermined pH and "X" values for injection. Both liquid A which comprises the non-alkaline aqueous solution of silicic acid of pH and "X" values described above, and liquid B which comprises the aqueous solution of the pH adjusting agent may be together injected. This method is suitable for injecting a blend which is relatively short in gelation time.

In addition, it is possible to use any injection pipe such as a strainer pipe, a dual pipe, or a rod pipe. In the case of injection of the joined liquids A and B, the joining of these liquids may be effected at the tip portion, the end portion or the middle portion of the injection pipe, or in the piping system including the mixer before the liquids flow in the injection pump. Furthermore, the injection may be carried out at a normal pressure, or may be of a jet stream injection effected at a high pressure of from several tens kg/cm$^2$ to several thousands kg/cm$^2$. Alternatively, the injection may be carried out with the injection pipe fixedly secured, or may be carried by moving the injection pipe vertically, or by turning the injection pipe.

The ground can be simultaneously reinforced and cut-off water, especially in the following manner; at first, a dual injection pipe is inserted into the ground, and then, while drawing up the pipe, the non-alkaline aqueous solution of silicic acid is jetted laterally at a high pressure from the tip end of the inner pipe to loosen the ground around it, and at the same time, cement milk is injected at an atmospheric pressure to fill into the loosen part. In this case, a cylindrically solidified part is formed if the inner pipe is rotated, on the other hand a solidified layer spread toward one direction is formed if the pipe is not rotated.

In the method described above, the ground is loosen by said high pressure solution of silicic acid and, at the same time, the cement milk is forced to be blended with soil. As a result of rapid solidification with the cement, the solidified soil is soon formed without influence of the underground water flow. The non-alkaline aqueous solution of silicic acid can permeate between soil particles where the cement milk does not reach and effectively solidify the soil and cut-off water.

EXAMPLE 1

An injection experiment was carried out by utilizing a soil layer in Tokyo, Japan, which is of a fine sand ground and is under the surface of the underground water. The injections liquids were prepared in accordance with the method described with reference to Experiment-1. Sulfuric acid was employed as the acidic reactant so as to have $[SiO_2]=2.04$, and an acidic silicic acid aqueous solution ($\alpha=0.16$) whose pH value is about 2.4 was prepared. Then, sodium bicarbonate as the pH adjusting agent was added into the aqueous solution, and they were mixed by use of the mixer so that the resultant blend was precisely 3.2 in pH (gelation time being approximately 60 minutes). Three thousand liters of this blend was injected into the soil layer. Before, during and after the injection, the underground water was sampled from an inspection hole provided 5 meters remote from the injection point for measurement of the pH values. The results of the pH value measurement were as indicated below:

| Measurement time | Before injection | During injection | After injection | |
|---|---|---|---|---|
| | | | 3 days later | 1 week later |
| pH Value | 6.8 | 6.2 | 6.4 | 6.8 |

The permeability test result at the site showed $k=6.8\times10^{-3}$ cm/sec before the injection, but $k=8.3\times10^{-6}$ cm/sec after the injection. One week after the injection, the soil layer was subjected to excavation, and it was found that the soil was solidified in a diameter of 2.5 m around the injection pipe, and that a solidified soil of approximately 10 m$^3$ in volume was provided.

A specimen taken out of the solidified soil showed a uniaxial compression strength of qu=12.5 kg/cm$^2$.

EXAMPLE 2

An injection test was carried out in accordance with a dual pipe injection system in the out-off construction of subsoil having fine sand. Graut A was prepared in accordance with the method described in Experiment-1. Sulfuric acid was employed as the acidic reactant so as to have $[SiO_2]=1.36$, and an acidic aqueous solution of silicic acid ($\alpha=0.157$) whose pH value is about 3.0 (pH$\doteq$3.0). Then, a water glass aqueous solution was employed as the pH adjusting agent so as to adjust the pH value to 3.5 (gelatin time being approximately 30 minutes). Graut B was prepared with 300 kg of Portland cement and 30 kg of bentonite per m³.

Dual pipes which have outer and inner pipes of 90 mm and 30 mm in diameters respectively, 60 cm apart each other, were inserted into the ground to 10 m depth. They had lateral holes for jetting at the end of the inner pipe. The end of the inner pipe was placed 10 cm under that of the outer one. While rotating only the inner pipe (the outer one were not rotated) and drawing up the dual pipe slowly, the graut A described above was jetted at a high pressure of 200 kg/cm² from the inner pipe and, at the same time, the aforementioned grout B was injected at a pressure of 10 kg/cm² from the outer pipe. Investigations after digging showed that solidified soils of about 100 cm in diameter were formed around injection holes and their axial parts of 50 cm in diameter were strong cylinders which contained the cement predominantly. The outer parts of said cylinders consisted of the soils solidified by the grout A. Adjacent axial parts which contained rich cement were combined completely by the solidified soils, and thus no leakage of the underground water therethrough was observed. When the inner pipes were not rotated, cut-off layers of 20 cm width were formed between adjacent injection pipes. Solidified cement rich parts and their outer solidified soil parts were overlapped each other, thus their strength and cut-off property were superior.

EXAMPLE 3

An injection experiment was given to a find sand layer including silt in which soft clay layers are interposed. Grout A was prepared similarly as in the case of the acidic silicic acid aqueous solution employed in Experiment-1, while grout B was prepared with 500 kg of Portland blast furnace Portland cement, 30 kg of bentonite and 1 kg of sodium carbonate per m³. The grouts A and B were joined together at an equal ratio in quantity by the use of "Y"—shaped pipe, and the grouts thus joined were injected to an amount of 2,000 liters in total. Successively, 2,000 liters of one of the grouts was injected into the layer. One week after the injection, the layer was subjected to excavation. As a result, it was found that pulsive solidified layers were firmly formed with the joined liquid of the grouts A and B in the interfaces between the clay layer and the soft soil layer containing a large quantity of silt or the soil layer, and that only the grout A was penetrated between the particles of the fine sand layer including minutes blocks of silt, thus, as a whole, forming strongly solidified body.

As for the uniaxial compression strength of a specimen taken out of the excavated layer, the body solidified with the grouts A and B showed qu=50 kg/cm², while the uniaxial compression strength of the soil solidified by the grout A showed qu=15.1 kg/cm².

EXAMPLE 4

An injection experiment was given to a debris ground having a permeability coefficient of approximately $10^{-1}$ cm/sec ($k=10^{-1}$ cm/sec). First of all, a cement milk containing 500 kg of Portland cement per 1,000 liters was injected into the ground. The following day, water was sampled out of the place where the cement milk was injected, to measure the pH value thereof. The value of the pH of the water thus measured was 9.8. Then, a non-alkaline aqueous solution of $SiO_2$ molar concentration 2.04, pH=3.0, $X=1.2\times10^{-4}$ and gelation time about 200 minutes was injected for 60 minutes.

Then, the following day, water was sampled out of the place where the aqueous solution was injected to measure the pH value thereof. It was found that the pH value of the water thus measured was 6.0. One week later, the ground was excavated for investigation. As a result of the investigation, it was found that the cement was solidified between the coarse soil particles, and that the whole region of the ground aimed to be solidified was solidified by the acidic silicic acid aqueous solution around the injection pipe without deviating from the predetermined injection depth.

For the purpose of comparison, an acidic aqueous solution of silicic acid similar to that described above was injected without injecting the cement milk, and then the ground thus injected was excavated. As a result of the excavation, it was found that the body solidified was moved 1.5 m below the predetermined injection depth.

What is claimed is:

1. An injection process for the solidifying of a soft ground or preventing water-leaking ground from water leakage comprising the steps of
    injecting a blend of water glass type grout thereinto, wherein said blend comprises a non-alkaline aqueous solution of silicic acid which is obtained by
    mixing water glass into an aqueous solution of an acidic reactant so as to remove alkali from said water glass, said non-alkaline aqueous solution of silicic acid being prepared to meet both of the following conditions A and B:
    A. the pH value thereof is 5 or less; and
    B. a value of $$\frac{H+}{[SiO_2]^n}$$

is $1\times10^{-3}$ or less;

where [H+] is the molar concentration of hydrogen ions, [$SiO_2$] is the molar concentration of silicon dioxide, and n is the molar ratio of said water glass, thereby solidifying the ground in sufficient strength without forming blocks of silica.

2. The process as set forth in claim 1, wherein
    said aqueous solution is prepared prior to the mixing of the water glass into said aqueous solution by mixing acidic reactant with water.

3. An injection process as claimed in claim 1, in which said value of $$\frac{[H^+]}{[SiO_2]^n}$$

is adjusted to be in a range of $1\times10^{-3}$ to $5\times10^{-6}$.

4. An injection process as claimed in claim 1, in which a pH adjusting agent is added and mixed into said non-alkaline aqueous solution of silicic acid to finely adjust the pH value of said aqueous solution to a desired value.

5. An injection process as claimed in claim 1, in which a non-alkaline aqueous solution of silicic acid relatively low in pH value is prepared by mixing water glass into aqueous solution of acidic reactant, and a pH adjusting agent serving as an alkaline agent is added and mixed into non-alkaline aqueous solution of silicic acid so as to increase the pH value thereof thereby to adjust said pH value to a desired value of 5 or less, whereby non-alkaline aqueous solution of silicic acid is allowed to have a desired gelation time.

6. An injection process as claimed in claim 5, in which said alkaline pH adjusting agent is joined to said non-alkaline aqueous solution of silicic acid relatively low in pH value at the time of injection.

7. An injection process as claimed in claim 4 or 5, in which said pH adjusting agent is one or more selected from the group consisting of water glass and alkaline salts.

8. An injection process as claimed in claim 7, in which said alkaline salt is selected from a group comprising of alkaline salts of carbonic acid or alkaline salts of bicarbonic acid.

9. An injection process as claimed in claim 1, in which said acidic reactant is selected from a group comprising of mineral acids including sulfuric acid, hydrochloric acid and phosphoric acid.

10. An injection process as claimed in claim 1, in which said addition and mixing of the water glass into aqueous solution of said acidic reactant is carried out by jetting said water glass into said aqueous solution of acidic reactant.

11. An injection process as claimed in claim 1, in which non-alkaline aqueous solution of silicic acid contains one selected from a group consisting of cement or clay.

12. An injection process as claimed in claim 1, in which the injection of said non-alkaline aqueous solution of silicic acid and the injection of suspension which contains one selected from a group consisting of cement or clay, as an effective component thereof, are carried out in combination.

13. An injection process as claimed in claim 1, in which a blend, which contains at least one selected from the group consisting of cement and alkaline pH adjusting agent, is joined to said non-alkaline aqueous solution of silicic acid at the time of injection.

14. An injection process as claimed in claim 13 or 6, in which the joining of said liquids is effected at the tip ends of injection pipes inserted into the ground.

15. An injection process as claimed in claim 14, in which at least one of said liquids is jetted into the ground at a high pressure.

16. An injection process as claimed in claim 14 or 15, in which said injection pipes are dual injection pipe consisting of inner pipe and outer pipe, and said non-alkaline aqueous solution of silicic acid is jetted from the tip end of the inner pipe into the ground at a high pressure to loosen the ground, and at the same time said other liquid is injected at an atmospheric pressure to fill into the loosened ground.

17. An injection process for the solidifying of a soft ground or preventing water-leaking ground from water leakage, comprising the steps of injecting a blend of water glass type grout thereinto, wherein said blend comprises a non-alkaline aqueous solution of silicic acid which is obtained by mixing water glass into an aqueous solution of an acidic reactant so as to remove alkali from said water glass, said non-alkaline aqueous solution of silicic acid being prepared to meet both of the following conditions A and B:

A. the pH value thereof is 5 or less; and

B. a value of $$\frac{H+}{[SiO_2]^n}$$

is $1 \times 10^{-3}$ or less where [H+] is the molar concentration of hydrogen ions, [$SiO_2$] is the molar concentration of silicon dioxide, and n is the molar ratio of said water glass, thereby solidifying the ground in sufficient strength without forming blocks of silica, performing the process with an apparatus comprising a mixing mechanism for preparing a non-alkaline aqueous solution of silicic acid, an injection pipe mechanism to be provided in the ground for injecting said aqueous solution thereinto, and a conveying mechanism interposed between said mixing mechanism and said injection pipe mechanism for conveying said aqueous solution from said mixing mechanism to said injection pipe mechanism, in which said mixing mechanism comprises: material containers for containing materials for preparation of said non-alkaline aqueous solution of silicic acid by adding and mixing water glass into aqueous solution of acidic reactant therein; a supplying mechanism provided in each of said pipes, for supplying said materials in said material containers to said mixing container, thereby to prepare the non-alkaline aqueous solution of silicic acid by adding and mixing water glass into aqueous solution of acidic reactant in the mixing container.

* * * * *